(12) United States Patent
Rifkin

(10) Patent No.: US 7,853,539 B2
(45) Date of Patent: Dec. 14, 2010

(54) DISCRIMINATING SPEECH AND NON-SPEECH WITH REGULARIZED LEAST SQUARES

(75) Inventor: Ryan Rifkin, Cambridge, MA (US)

(73) Assignee: Honda Motor Co., Ltd., Tokyo (JP)

( * ) Notice: Subject to any disclaimer, the term of this patent is extended or adjusted under 35 U.S.C. 154(b) by 1063 days.

(21) Appl. No.: 11/559,812

(22) Filed: Nov. 14, 2006

(65) Prior Publication Data

US 2007/0073538 A1 Mar. 29, 2007

Related U.S. Application Data

(63) Continuation-in-part of application No. 11/535,921, filed on Sep. 27, 2006, now Pat. No. 7,685,080.

(51) Int. Cl.
*G06N 5/00* (2006.01)

(52) U.S. Cl. .......................................... 706/10; 706/45
(58) Field of Classification Search .................. 706/10, 706/45; 704/232
See application file for complete search history.

(56) References Cited

U.S. PATENT DOCUMENTS 5,839,103 A * 11/1998 Mammone et al. .......... 704/232

OTHER PUBLICATIONS

Tommaso, et al, The measure of randomness by leave one out prediction error in the analysis of EEG after laser painful stimulation in healthy subjects and migraine patients, Clinical Neurophysiology, vol. 116, 2005, pp. 2775 to 2782.*

Rifkin, R., et al, Discriminating Speech and Non-Speech with Regularized Least Squares, Ninth International Conference on Spoken Language Processing, Pittsburgh, PA, Sep. 2006, pp. 1-4.*

Aronszajn, N., "Theory of Reproducing Kernels," Transactions of the American Mathematical Society, May 1950, pp. 337-404, vol. 68.

Chi, T., et al., "Multiresolution Spectrotemporal Analysis of Complex Sounds," Journal of the Acoustical Society of America, Aug. 2005, pp. 887-906, vol. 118, No. 2.

De Lathauwer, L., et al., "A Multilinear Singular Value Decomposition," SIAM Journal of Matrix Analysis and Applications, 2000, pp. 1253-1278, vol. 21, No. 4.

Evgeniou, T., et al., "Regularization Networks and Support Vector Machines," Advances in Computational Mathematics, 2000, pp. 1-50, vol. 13.

Fine, S., et al., "Efficient SVM Training Using Low-Rank Kernel Representations," Journal of Machine Learning Research, 2001, pp. 243-264, vol. 2.

(Continued)

*Primary Examiner*—Wilbert L Starks, Jr.
(74) *Attorney, Agent, or Firm*—Fenwick & West LLP; Mark Duell

(57) ABSTRACT

Sound discrimination techniques are disclosed that can be employed, for example, in the task of discriminating speech and non-speech in a noisy environment and other noise classification applications. In one particular embodiment, a classifier system is provided that includes a linear Regularized Least Squares classifier used directly on a high-dimensional cortical representation of the target sound. The regularization constant lambda ($\lambda$) can be selected automatically, yielding a parameter-free learning system. In addition, the high-dimensional hyperplane can be viewed directly in the cortical space, leading to greater interpretability of the classifier results.

21 Claims, 6 Drawing Sheets

OTHER PUBLICATIONS

Golub, G. H., et al., "Matrix Computations, Third Edition," 1996, pp. vii-ix.

Hastie, T., et al., "The Entire Regularization Path for the Support Vector Machine (1)," Journal of Machine Learning Research, 2004, pp. 1391-1415, vol. 5.

Hastie, T., et al., "The Entire Regularization Path for the Support Vector Machine (2)," 8 pages, Year: 2004.

Joachims, T., et al., "Estimating the Generalization Performance of a SVM Efficiently," Dec. 29, 1999, Universität Dortmund, pp. 1-27, Technical Report LS-8, Report 25.

Kingsbury, B., et al., "Robust Speech Recognition in Noisy Environments: The 2001 IBM Spine Evaluation System," IEEE, to appear in Proceedings of ICASSP, 2002, pp. I-53-I-56.

Lehoucq, R. B., et al., "Deflation Techniques for an Implicitly Restarted Arnoldi Iteration," SIAM Journal on Matrix Analysis and Applications, Oct. 1996, pp. 789-821, vol. 17, No. 4.

Lehoucq, R. B., et al., "Arpack Users Guide: Solution of Large Scale Eigenvalue Problems by Implicitly Restarted Arnoldi Methods," Computational and Applied Mathematics, Technical Report, Rice University, Mar. 14, 1997, pp. 1-140.

Mesgarani, N., et al., "Discrimination of Speech from Nonspeech Based on Multiscale Spectro-Temporal Modulations," IEEE Transactions on Audio, Speech, and Language Processing, May 2006, pp. 920-930, vol. 14, No. 3.

Ramaswamy, S., et al., "Multiclass Cancer Diagnosis Using Tumor Gene Expression Signatures," PNAS, Dec. 18, 2001, pp. 15149-15154, vol. 98, No. 26.

Rifkin, R. M., et al., "Everything Old is New Again: A Fresh Look at Historical Approaches in Machine Learning," Doctoral Dissertation, Massachusetts Institute of Technology, Sep. 2002, pp. 1-225.

Rifkin, R., et al., "In Defense of One-Vs-All Classification," Journal of Machine Learning Research, 2004, pp. 101-141, vol. 5.

Scheirer, E., et al., "Construction and Evaluation of a Robust Multifeature Speech/Music Discriminator," IEEE, to appear in the Proceedings of ICASSP, Apr. 21-24, 1997, pp. 1-4.

Schölkopf, B., "A Generalized Representer Theorem," 14th Annual Conference on Computational Learning Theory, 2001, pp. 416-426.

Smola, A. J., "Sparse Greedy Matrix Approximation for Machine Learning," Proceedings of the International Conference on Machine Learning, 8 pages, Year: 2000.

Vapnik, V. N., "Statistical Learning Theory," John Wiley & Sons, Inc., 1998, pp. vii-xix, 1-15.

Wahba, G., "Spline Models for Observational Data," Society for Industrial and Applied Mathematics, 1990, pp. 1-20, 45-65, vol. 59 of CBMS-NSF Regional Conference Series in Applied Mathematics.

Williams, C. K. I., et al., "Using the Nyström Method to Speed Up Kernel Machines," Advances in Neural Information Processing Systems 13, Proceedings of the 2000 Conference, 2000, pp. 682-688.

Yang, C., et al., "Efficient Kernel Machines Using the Improved Fast Gauss Transform," Advances in Neural Information Processing Systems 17, Proceedings of the 2004 Conference, 2004, pp. 1561-1568.

* cited by examiner

DISCRIMINATING SPEECH AND NON-SPEECH WITH REGULARIZED LEAST SQUARES

RELATED APPLICATIONS

This application is a continuation-in-part of U.S. application Ser. No. 11/535,921, filed Sep. 27, 2006, titled "Regularized Least Squares Classification/Regression," which claims the benefit of U.S. Provisional Application No. 60/721,753, filed Sep. 28, 2005, titled "Making Regularized Least Squares Practical." Each of these applications is herein incorporated in its entirety by reference.

FIELD OF THE INVENTION

The invention relates to sound discrimination, and more particularly, to discriminating speech from non-speech.

BACKGROUND OF THE INVENTION

The task of categorizing sound is important in a variety of applications, including speech recognition, audio retrieval, and robotics. Consider, for example, the specific task of discriminating speech from non-speech in humanoid robot applications. This is a crucial ability for a robot, as the appropriate responses to speech and other environmental sounds are very different.

The task of discriminating speech from non-speech is difficult for several reasons. For instance, the robot may be situated in an environment that is noisy and reverberant, and/or the speaker or sound may be quite far from the robot, and/or the robot itself may contain many noise generators such as motors and fans. An important decision in any auditory application is the choice of a mathematical representation of sound. Over the past few years, there has been substantial activity and progress in understanding how sound is represented in the mammalian cortex.

One model, developed by Shamma et al. is based on recent psychoacoustic and neurophysiological knowledge about the early and central stages of the mammalian auditory system. In this model, each short (8 ms) time-slice is represented as a three-dimensional tensor in frequency, rate, and scale space. The representation is very high-dimensional: the model generally uses 128 frequencies, 12 rates and 5 scales, so each time-slice is 7,680 dimensional.

This model was used by Mesgarani et al. to discriminate speech from non-speech. In that particular application, the discrimination was done in two stages. First, dimensionality reduction was performed using a Higher-Order Singular Value Decomposition (HOSVD), an analog of the standard SVD that respects the tensor nature of the cortical representation. In the second stage, a Support Vector Machine classifier with a Gaussian kernel was applied.

Although the HOSVD with Gaussian SVM system achieved state-of-the art performance, it has a number of drawbacks, including relatively high conceptual and computational complexity. For instance, the system has several tunable parameters: the number of components to keep must be determined separately for the scale, rate, and frequency subspaces, and the bandwidth of the SVM Gaussian kernel must be chosen. In addition, the dimensionality reduction of the first stage generally produces a complex result which can be difficult to interpret.

What is needed, therefore, are sound discrimination techniques that are more accurate, conceptually simpler, and computationally simpler.

SUMMARY OF THE INVENTION

One embodiment of the present invention provides a computer implemented methodology for sound discrimination (e.g., voice and/or non-voice). The method includes receiving a training set of data, generating a cortical representation of the training set, and computing a matrix decomposition using the cortical representation of the training set (e.g., eigendecomposition or SVD). The method further includes receiving a plurality of regularization parameters, and computing coefficients for each regularization parameter using the matrix decomposition. The method continues with computing a leave-one-out (LOO) error for each of the regularization parameters, and selecting the regularization parameter with the lowest LOO error. The method may further include predicting future data points based on at least one of coefficients c or a hyperplane function w associated with the selected regularization parameter. In one particular case, computing a matrix decomposition using the cortical representation of the training set includes computing a singular value decomposition (SVD) using the cortical representation of the training set, wherein the SVD is the matrix decomposition. In another particular case, computing a matrix decomposition using the cortical representation of the training set includes forming a kernel matrix using the cortical representation of the training set, and computing an eigendecomposition of the kernel matrix, wherein the eigendecomposition is the matrix decomposition. In one such case, the kernel matrix is represented explicitly, and the method includes storing the kernel matrix. In another such case, the kernel matrix is represented explicitly, and the method computes the LOO error for all the regularization parameters in $O(n^3+n^2d)$ time and $O(n^2)$ space, where n is the number of points in d dimensions of the cortical representation of the training set. In another such case, the kernel matrix is an n by n matrix K satisfying $K_{ij}=K(\bar{x}_i,\bar{x}_j)$ and having a form $$K(\bar{x}, \bar{x}_j) = \exp\left(\frac{\|\bar{x}_i - \bar{x}_j\|^2}{2\sigma^2}\right),$$

where x is a vector of data points included in the cortical representation of the training set and σ is a user-selected bandwidth parameter. Alternatively, the kernel matrix can be represented using, for example, matrix vector products (particularly if the matrix is too large to store all at once). In one such case, the matrix vector products are approximated using an Improved Fast Gauss Transform (IFGT).

Another embodiment of the present invention provides a machine-readable medium (e.g., one or more compact disks, diskettes, servers, memory sticks, or hard drives) encoded with instructions, that when executed by one or more processors, cause the processor to carry out a process for sound discrimination (e.g., voice and/or non-voice). This process can be, for example, similar to or a variation of the previously described method.

Another embodiment of the present invention provides a sound discrimination system (e.g., voice and/or non-voice). The system functionality (e.g., such as that of the previously described method or a variation thereof) can be implemented with a number of means, such as software (e.g., executable instructions encoded on one or more computer-readable mediums), hardware (e.g., gate level logic or one or more ASICs), firmware (e.g., one or more microcontrollers with I/O capability and embedded routines for carrying out the functionality described herein), or some combination thereof. In one particular case, the system is implemented in a computing environment such as a desktop or laptop computer, with an executable sound discrimination module or set of modules stored therein.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

FIG. 6 shows the equal error rates of the clean trained classifiers across a range of regularization constants, for varying SNRs, in accordance with an embodiment of the present in.

DETAILED DESCRIPTION OF THE INVENTION

Sound discrimination techniques are disclosed that are more accurate, conceptually simpler, and computationally simpler relative to conventional techniques, such as the HOSVD with Gaussian SVM.

The techniques can be employed, for example, in the task of discriminating speech and non-speech in a noisy environment. In one particular embodiment of the present invention, a linear Regularized Least Squares (RLS) classifier is used directly on a high-dimensional cortical representation of the target sound. The regularization constant lambda ($\lambda$) is selected automatically, yielding a parameter-free learning system (i.e., no tunable parameters).

The single regularization constant $\lambda$ can be found automatically, for example, through leave-one-out (LOO) cross-validation. In addition, because dimensionality reduction is avoided, the linear classifier can be viewed directly in the same space as the data (the high-dimensional hyperplane can be viewed directly in the cortical space), leading to a more interpretable result.

System Architecture

Figure 1:
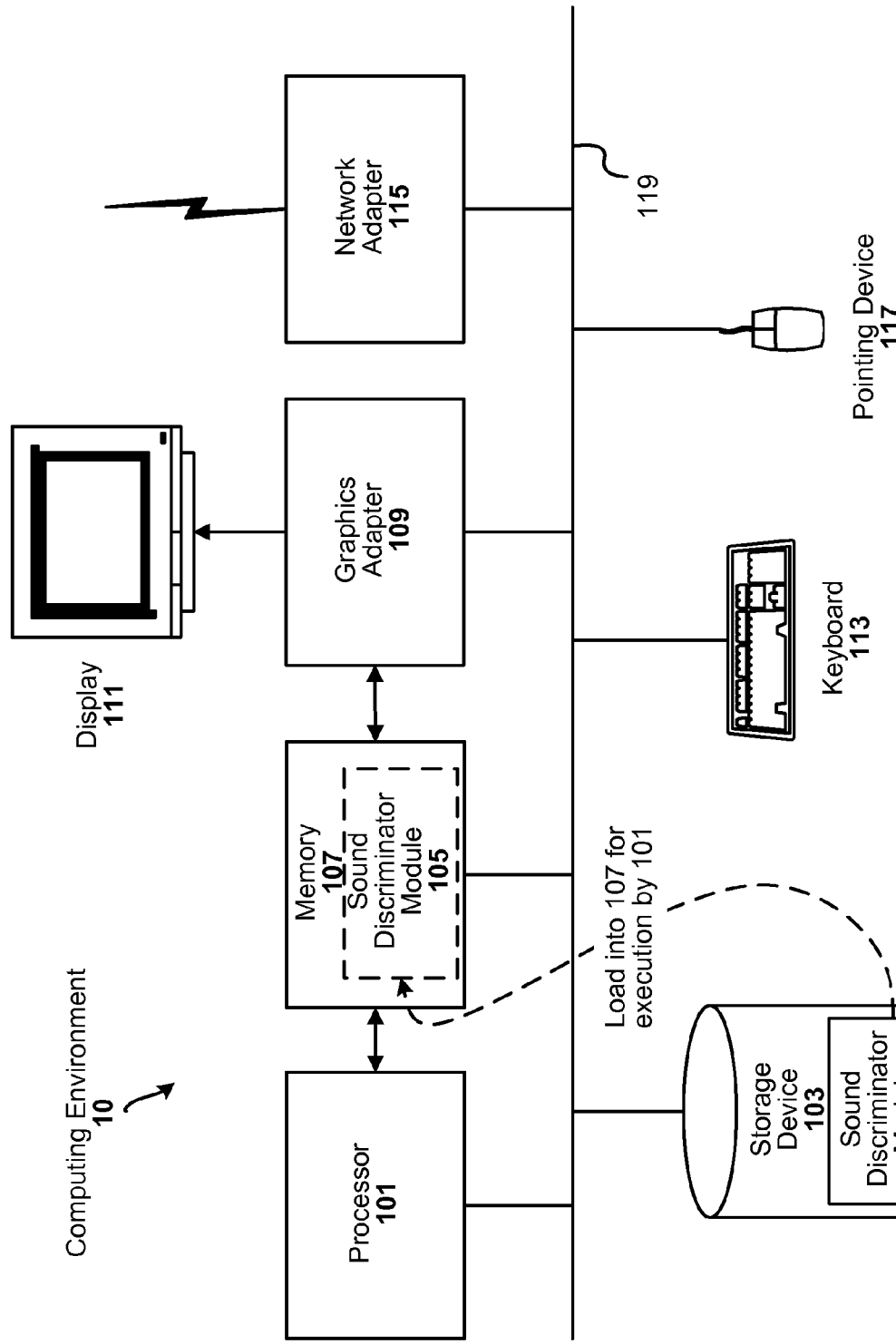
FIG. 1 is a block diagram illustrating a computing environment configured in accordance with an embodiment of the present invention.

FIG. 1 is a block diagram illustrating a computing environment 10 configured in accordance with an embodiment of the present invention.

As can be seen with this example, the computing environment 10 includes a processor 101 operatively coupled via a bus 119 to a memory 107, a storage device 103 for storing a sound discriminator module 105 (and other executable code, such as an operating system and applications), a keyboard 113, a graphics adapter 109, a pointing device 117, and a network adapter 115. A display 111 is operatively coupled to the graphics adapter 109.

The processor 101 may be any processor or set of processors capable of executing various operating systems (e.g., UNIX) and applications/drivers (e.g., MATLAB) of the computing environment 10. Numerous suitable processors (e.g., Intel Pentium, MAC G4 or G5 processors, AMD K processors, as well as any co-processors and other typical computing optimizations such as on-board caches) can be used, as will be apparent in light of this disclosure. The memory 107 may be, for example, firmware ROM, RAM, and/or flash memory, and holds instructions and data used by the processor 101 (e.g., 512 MByte or higher). The storage device 103 is a hard disk drive in one embodiment (e.g., 10 GByte or higher), but can also be any other device capable of persistently storing data, such as a memory stick and/or a solid-state memory device. The storage device 103 can hold multiple files containing executable code and/or data, as is typically done. The computing environment 10 operates to load an executable file into memory 107 and execute it using the processor 101. In the example embodiment shown, the sound discriminator module 105 is stored in storage device 103 as executable code, and is loaded into memory 107 for execution by the processor 101 as one or more processes.

The files stored on the storage device 103 can be, for example, in the MATLAB format (sometimes referred to as M-files). Other file formats may also be stored on storage device 103, such as .EXE files, .DLL files, .INI files and any other file types necessary for the computing environment to properly operate. Such files are typical of computing environments that employ Microsoft operating systems. Other file formats, such as those utilized by Apple Macintosh and UNIX based computers will be apparent in light of this disclosure.

The pointing device 117 may be a mouse, track ball, or other such user input device, and is used in combination with the keyboard 113 to allow the user to interact with the computing environment 10 (e.g. input data and respond to prompts), as is typically done. The graphics adapter 109 displays images and other information on the display 111. The network adapter 115 communicatively couples the computing environment 10 with an external network such as the Internet or LAN, or combination thereof (e.g., via conventional wired or wireless technology), if so desired and as is typically done.

The computing environment 10 is adapted to execute computer program modules for providing sound discrimination functionality described herein, including those of the sound discriminator module 105. Structure and functionality of the sound discriminator module 105 will be discussed in further detail with reference to FIGS. 2 through 6. As will be apparent in light of this disclosure, the computing environment 10 can be implemented via processing systems such as a general purpose desktop or laptop computer, or a special-purpose processing system configured to carryout the RLS classification using a high dimensional cortical representation as described herein. In one particular case, the computing environment 10 is implemented with an IBM T42 laptop with a 3.4 GHz Pentium IV processor and 2 GBytes of RAM. Other computationally intensive processes can be limited as needed to reserve processing power for sound processing and discrimination as discussed herein, although a standard user desktop environment can also be running.

Sound Discriminator Module

Figure 2:
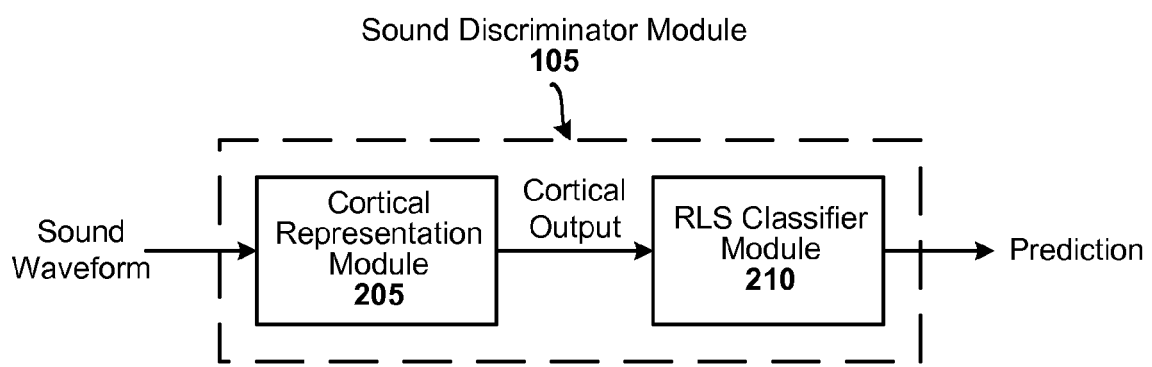
FIG. 2 is a block diagram illustrating a sound discrimination module configured accordance with an embodiment of the present invention.

FIG. 2 is a block diagram illustrating modules within the sound discriminator module 105 configured in accordance with an embodiment of the present invention. As can be seen, the module 105 includes a cortical representation module 205 and an RLS classifier module 210. In operation, a sound waveform is input to the cortical representation module 205, which generates a cortical output that is applied to the RLS classifier module 210. The RLS classifier module 210 is trained to predict, for example, whether the input sound (an in particular, its cortical representation) is voice or non-voice, and may be further configured to determine more specific predictions such as what person is speaking or to categorize a non-voice sound (e.g., door-bell ringing, telephone ringing, alarm clock beeping, gun shot, dog barking, classical music, foot steps, knocking, etc).

The cortical representation module 205 is programmed or otherwise configured to receive a target sound waveform and generate a high dimensional cortical representation of that waveform upon which the RLS classifier 210 operates. All kernel learning algorithms, such as SVM and RLS, construct functions in a linear feature space. When nonlinear kernels such as the Gaussian are used, the feature space is implicit, and high or infinite dimensional. However, the cortical representation itself is already an explicit nonlinear "lifting" of the auditory spectrogram into a high-dimensional space: a linear function on the cortical representation is a nonlinear function on the spectrogram. In a more general sense, explicitly choosing a nonlinear (but computationally tractable) feature space, and explicitly working in that feature space, is frequently an excellent way to achieve desirable tradeoffs between accuracy and computational demands. In accordance with one example embodiment, the cortical representation module 205 is written in MATLAB (or other suitable software package). Alternatively, a real-time implementation can be used (which is generally faster), as will be apparent in light of this disclosure. Example structure and functionality of the cortical representation module 205 will be discussed in detail with reference to FIG. 3.

Given data points $(x_1, y_1), \ldots, (x_n, y_n)$, where $x_i \in \Re^d$ and $y_i \in \{0,1\}$, the linear RLS classifier module 210 solves the following optimization problem, in accordance with one embodiment:

$$\min_{\omega \in \Re^d} \sum_{i=1}^{n} (x_i^T \cdot \omega - y_i)^2 + \lambda \|\omega\|^2.$$

Here, $\lambda$ is the regularization constant, which controls the tradeoff between fitting the training set accurately and finding a hyperplane with small norm. The so-called Representer Theorem proves (in a more general setting) that the RLS solution $\omega$ will be a weighted sum of the training points:

$$\omega = \sum_{i=1}^{n} c_i x_i.$$

Defining K to be the n by n matrix satisfying $K_{ij}=K(x_i, x_j)$, the RLS problem becomes:

$$\min_{c \in \Re^n} \|Kc - y\|^2 + \lambda c^T Kc.$$

Differentiation and simple algebra shows that the coefficients c can be found by solving the linear system $(K+\lambda I)c=y$. The constant $\lambda$ must be determined somehow. Defining the ith leave-one-out (LOO) value to be the error made on the ith training point when it is removed from the data set, a classifier is built on the remaining n−1 data points and tested on $x_i$, the RLS algorithm has the property that the vector of LOO values is given by:

$$\frac{c}{\text{diag}(K+\lambda I)^{-1}}.$$

In addition, finding the LOO vector for a large number of $\lambda$ s requires almost no additional work compared to that required for a single $\lambda$, if the eigendecomposition of the kernel matrix K is utilized: $K=V\Lambda V^T$, where $\Lambda$ is diagonal and $VV^T=I$. Once this eigendecomposition is obtained (in $O(n^3)$ time), c, the LOO values, and $\omega$ can be found for a given value of $\lambda$ in $O(n^2)$ time by exploiting the relation:

$$(K+\lambda I)^{-1} = (V\Lambda V^T + \lambda I)^{-1}$$
$$= (V(\Lambda + \lambda I)V^T)^{-1}$$
$$= V(\Lambda + \lambda I)^{-1} V^T.$$

The diagonal matrix $(\Lambda+\lambda I)$ is trivially invertible in $O(n)$ time, and $(K+\lambda I)^{-1}$ y or the diagonal of $(K+\lambda I)$ can be computed in $O(n^2)$ time (computing all of $(K+\lambda I)^{-1}$ explicitly would require $O(n^3)$ time, but this is generally not needed). Regularization constant $\lambda$ can be selected by performing a golden section search to determine the value of $\lambda$ with the smallest total LOO error. For RLS problems in which $O(n^2)$ memory (to store K) and $O(n^3)$ time is available, this is an attractive approach: as opposed to standard cross-validation, there is no need to separate data into training and validation sets, and all available training data can be used to build our classifier, yielding more accurate systems. Note that there exist specialized methods to address linear RLS in $O(nd+d^2)$ memory and $O(nd^2)$ time, and these methods can be employed when n>>d. In the case where d>n, it may be more effective to use the standard nonlinear kernel machinery, as described herein. Example structure and functionality of the RLS classifier module 210 is discussed in further detail with reference to FIGS. 4 and 5.

Cortical Representation Module

Figure 3:
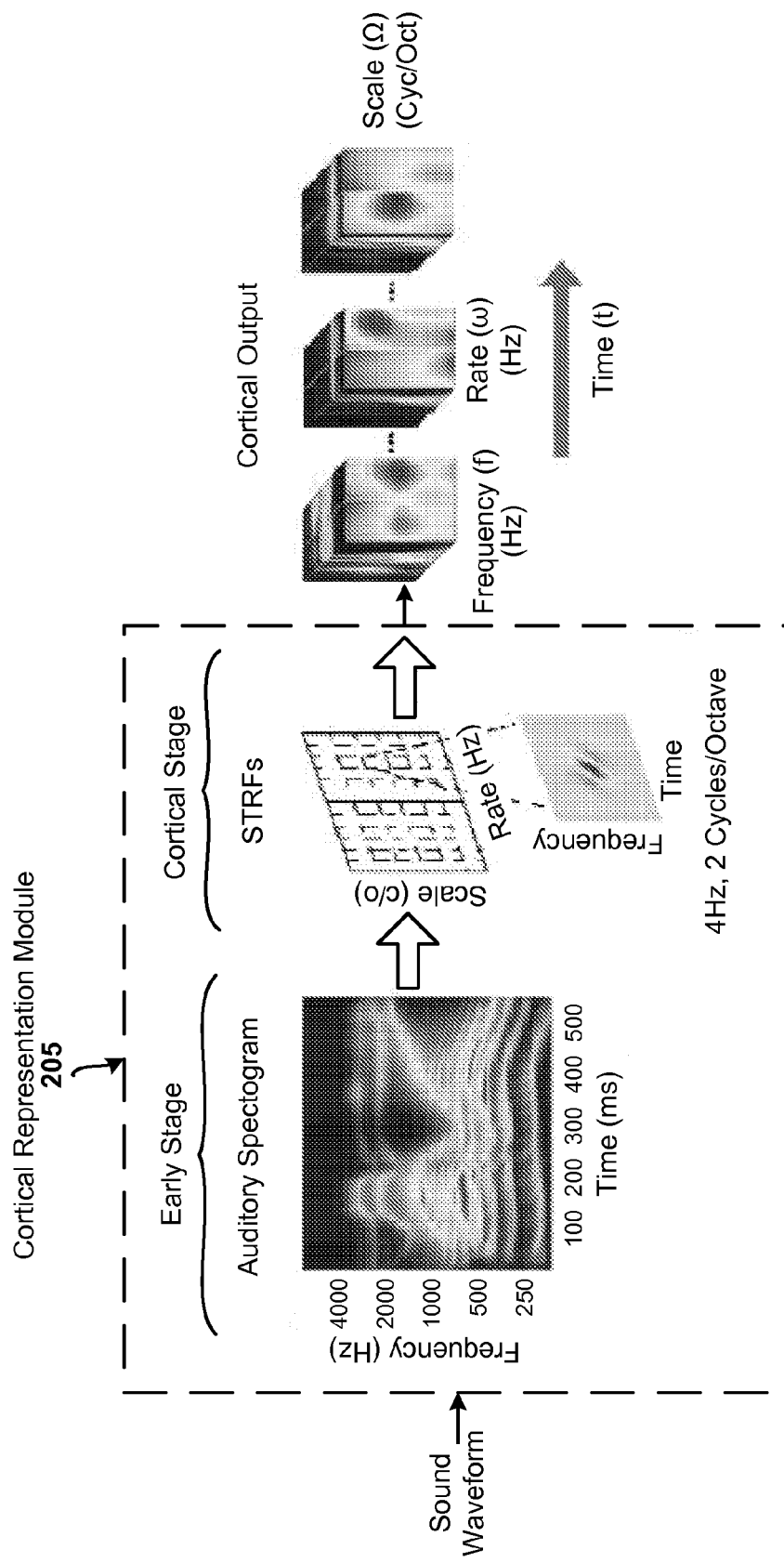
FIG. 3 is a block diagram illustrating a cortical representation module configured accordance with an embodiment of the present invention.

FIG. 3 is a block diagram illustrating a cortical representation module 205 configured accordance with an embodiment of the present invention.

As previously explained, one embodiment of the cortical representation module 205 includes multiple stages, including an early stage and a cortical stage, as shown in FIG. 3. In more detail, the spectrotemporal modulation features are extracted from an auditory model inspired by psychoacoustical and neurophysiological findings in the early and central stages of the auditory pathway. The early stage converts the sound waveform into an auditory spectrogram, which is a time-frequency distribution along a tonotopic (logarithmic frequency) axis. The second (cortical) stage performs a two dimensional wavelet transform of the auditory spectrogram, providing an estimate of its spectral and temporal modulation content. In one embodiment, this cortical stage is computationally implemented by a bank of two-dimensional (spectrotemporal) filters that are selective to different spectro-temporal modulation parameters ranging from slow to fast rates temporally (in Hertz), and from narrow to broad scales spectrally (in Cycles/Octave). The spectro-temporal impulse responses (or "receptive fields") of these filters are centered at different frequencies along the tonotopic axis. Note that STRF designation in the cortical stage of the module 205 shown in FIG. 3 stands for spectro-temporal receptive fields.

The basic mathematical formulation of the cortical model can be summarized as follows, in accordance with one particular embodiment:

$$y_{cochlea}(t,f) = 3Ds(t) * h_{cochlea}(t,f)$$

$$y_{an}(t,f) = 3D\delta_{cochlea}(\delta_t y_{cochlea}(t,f)) * \mu_{haircell}$$

$$y(t,f) = 3D \max(\delta_t y_{an}(t,f), 0) * \mu_{midbrain}$$

$$r\pm(t,f;\omega,\Omega) = 3D$$

$$y(t,f) *_{tf} [STRF\pm(t,f;\omega,\Omega)]$$

where, s(t) is the sound, $y_{cochlea}(t, f)$ is the cochlear filter output, $y_{an}(t, f)$ is auditory nerve patterns, y(t, f) is the auditory spectrogram, and r±(t, f; ω, Ω) is the cortical representation. The sign of r specifies the direction of spectrotemporal modulation:—for downward patterns, and + for upward patterns. The modulation representation of sound (r±(t, f; ω, Ω)=3D) is a 4-dimensional function of time (t), frequency (f), rate (ω) and scale (Ω). One can think of each point in the spectrogram as having a 2-dimensional rate-scale representation, r(t_c, f_c, ω, Ω) which indicates the modulation strength at all ω's and Ω's for that channel and instant. If the time dimension is averaged on a given duration of sound, the average rate-scale-frequency representation in that given time window is obtained. This three dimensional representation is used for the purpose of classification.

RLS Classifier Module

Figure 4:
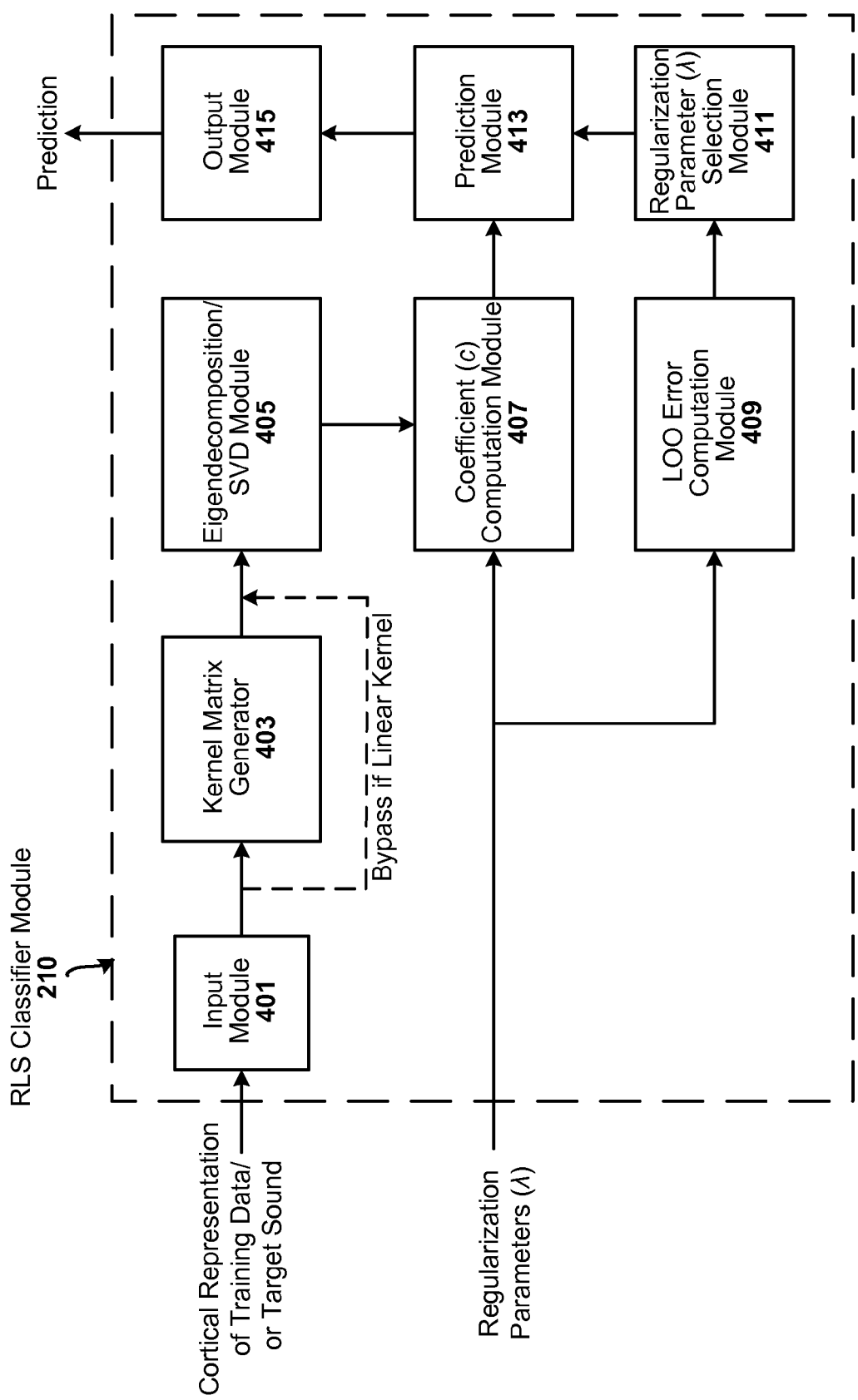
FIG. 4 is a block diagram illustrating a regularized least squares (RLS) classifier module configured accordance with an embodiment of the present invention.

FIG. 4 is a block diagram illustrating modules within the RLS classifier module 210 of FIG. 2, configured in accordance with an embodiment of the present invention.

As can be seen, module 210 includes an input module 401, a kernel matrix generator 403, an eigendecomposition/SVD module 405, a coefficient (c) computation module 407, a leave-one-out (LOO) error computation module 409, a regularization parameter (λ) selection module 411, a prediction module 413, and an output module 415. In one particular embodiment, each of these modules is implemented with executable software (e.g., C, C++, or other suitable instruction set) for providing the specified functionality. Note, however, that such modules can also be implemented in hardware (e.g., gate-level logic), firmware (e.g., microcontroller configured with embedded routines for carrying out each module's functionality), or some combination thereof. It will be understood in light of this disclosure that the modules illustrated herein represent one embodiment of the present invention. Other embodiments may include additional and/or different modules and functionality. Likewise, other embodiments may lack modules described herein and/or distribute the described classifier functionality among the modules in a different manner.

The input module 401 is programmed or otherwise configured to receive a cortical representation of the training set of data (from the cortical representation module 205). This data is used to train the RLS classifier module 210 for use in a given application (such as sound recognition in a noisy environment). This dataset can be represented as $S = (\bar{x}_1, y_1), (\bar{x}_2, y_2), \ldots, (\bar{x}_n, y_n)$ of n points in d dimensions. As previously indicated, the inductive learning task is to build a function $f(\bar{x})$ that, given a new point $\bar{x}$, can predict the associated y value.

The input module 401 may be further configured to format and structure the input data as needed (if at all), in preparation for generating the kernel matrix generation of pairwise distances. In one particular embodiment of the present invention, the input module 401 includes the functionality of the cortical representation module 205, and is therefore able to generate a cortical representation of the training set. The kernel matrix generator 403 is programmed or otherwise configured to form a kernel matrix (K) of the pairwise distances, where the kernel matrix K is size $O(n^2)$. Note that the kernel matrix generator 403 does not apply to the case of a linear kernel, where a singular value decomposition process can be used, in accordance with one embodiment of the present invention, and as will be discussed in turn.

For an RLSC algorithm in accordance with an embodiment of the present invention, the leave-one-out (LOO) error values are given explicitly via the formula:

$$LOOerror = \frac{G^{-1}Y}{\text{diag}(G^{-1})}$$

$$= \frac{c}{\text{diag}(G^{-1})}$$

As can be seen, the LOO values can be computed given the training weights c (also referred to as coefficients c; in general, c represents training points on the functional expansion) and the diagonal of the inverse of the regularized kernel matrix G. Given the eigendecomposition $K = Q\Lambda Q^t$, c(λ) can be computed in $O(n^2)$. LOO error can also be computed in $O(n^2)$ time. A single entry of $G(\lambda)^{-1}$ can be computed in $O(n)$ time, as will be discussed with reference to module 407. Thus, diag($G^{-1}$) can be computed, and compute LOO error, in $O(n^2)$ time.

The coefficient c computation module 407 is programmed or otherwise configured to receive a collection of regularization parameters (λ), and to compute coefficients c for each λ using the matrix decomposition computed by module 405. In more detail, for a given λ, module 407 operates to compute the associated c and diag($G^{-1}$) by exploiting the fact that adding λI to K shifts all the eigenvalues by λ, but does not change the associated eigenvectors: $(K+\lambda I) = V(\Lambda+\lambda I)V'$. In one particular embodiment, the coefficient c computation module 407 operates to apply the following formulae to compute c for each λ:

$$c = V(\Lambda + \lambda I)^{-1}V'y$$

$$G_{ij}^{-1} = (Q(\Lambda + \lambda I)^{-1}Q^t)_{ij}$$

$$= \sum_{k=1}^{n} \frac{Q_{ik}Q_{jk}}{\Lambda_{kk} + \lambda}$$

Thus, it takes $O(n^3)$ to solve a single RLS problem for c. If an eigendecomposition of K is computed, c(λ) can be computed and ||LOO error (λ)|| over a quite fine grid of λ, at basically no additional cost. Applying these techniques uses $O(n^3)$ time and $O(n^2)$ memory.

The eigendecomposition/SVD module 405 is programmed or otherwise configured to compute the eigendecomposition of the kernel matrix K. Alternatively, or in addition to (and for the case of a linear kernel), the eigendecomposition/SVD module 405 can be configured to compute the singular value decomposition (SVD) of the data matrix (the cortical representation of the training set of data).

With respect to the special case of a linear kernel $k(X_i, X_j) = X_i^t \cdot X_j$, assume we are in $R^d$, with d<n. If d>n, then ignore the fact that the kernel is linear, and use the eigendecomposition approach previously discussed. Assuming d<n, then define the matrix X to contain the entire training set, with one data point per row: the $i^{th}$ row of X is $X_i^t$. Note that this is a mathematical notation decision; not a decision about how to represent data on disk or in memory. With this convention, X has n rows and d columns. With a linear kernel, the function being learned is linear as well:

$$f(x) = \sum_i c_i k(X_i, x)$$
$$= c^t X x$$
$$= w^t x.$$

where the hyperplane w is defined to be $X^t c$. New points can be classified in O(d) time, using w, rather than having to compute a weighted sum of n kernel products (which will usually cost O(nd) time). Further assume that the n by d data matrix X has full column rank and economy-size singular value decomposition $X = USV^t$, where $U^t U = VV^t = V^t V = I_d$. Note that $UU^t \neq I_n$), and S is a positive semi-definite diagonal matrix of singular values. The kernel matrix K is given by $K = XX^t = (USV^t)(VSU^t) = US^2 U^t$. Expressions can be derived for the expansion coefficients c, the hyperplane function w, and the LOO error values. In accordance with one embodiment of the present invention, one set of formulas is obtained by directly using the relevant formulas for nonlinear LOO, but assuming we have the SVD:

$$c = (K + \lambda I)^{-1} Y$$
$$= (US^2 U^t + \lambda I)^{-1} Y$$
$$= U(S^2 + \lambda I)^{-1} U^t Y + \lambda^{-1} U_\perp U_\perp^t Y$$
$$w = X^t c$$
$$= VSU^t \left( U(S^2 + \lambda I)^{-1} U^t Y + \lambda^{-1} U_\perp U_\perp^t Y \right)$$
$$= VS(S^2 + \lambda I)^{-1} U^t Y$$
$$\text{diag}(G^{-1}) = \text{diag}\left( U(S^2 + \lambda I)^{-1} U^t + \lambda^{-1} U_\perp U_\perp^t \right)$$
$$= \text{diag}\left( U(S^2 + \lambda I)^{-1} U^t + \lambda^{-1} (I - UU^t) \right).$$

Computing the SVD takes $O(n^2)$ time and O(nd) memory. Once U is computed, c and $\text{diag}(G^{-1})$ can be obtained, for a given value of $\lambda$, in O(nd) time. Note that when n>>d, this represents an enormous savings, in that a good $\lambda$ can be found in time $O(nd^2)$ rather than time $O(n^3)$. For large datasets in high dimensions, there may be difficulty in fitting the dataset in memory. Also, although it is in principle possible to compute SVDs out of core or in parallel on a computing cluster, tools for doing so are not readily at hand. Thus, an alternate linear algebraic view of linear RLS is provided here, in accordance with an embodiment of the present invention. In particular, with a linear kernel, a hyperlane is being found, so the RLS problem can be phrased directly in terms of w, rather than c:

$$\min_{w \in R^d} L(w) = \frac{1}{2} \|Y - Xw\|_2^2 + \frac{\lambda}{2} \|w\|_2^2.$$

Taking the derivative with respect to w, $$\frac{\partial L}{\partial w} = X^t X w - X^t Y + \lambda w,$$

and setting to zero implies $$w = (X^t X + \lambda I)^{-1} X^t Y$$
$$= V(S^2 + \lambda I)^{-1} V^t X^t Y$$
$$\left( = V(S^2 + \lambda I)^{-1} V^t (VSU^t) Y \right)$$
$$\left( = VS(S^2 + \lambda I)^{-1} V^t U^t Y \right)$$

V and $S^2$ can be obtained from an eigendecomposition of the d by d $X^t X$. Additionally, $U = XVS^{-1}$, so any expression involving U can be written as $XVS^{-1}$. One advantage of this formulation is that it is not too difficult to write parallel or out-of-core programs for forming $X^t X$ or $X^t y$. In this approach, the most time consuming step is the formation of the covariance matrix $X^t X$, which takes $O(nd^2)$ time, after which its eigendecomposition can be taken in $O(d^3)$ time. This approach is computationally feasible given the ability to work with d by d matrices, although it does involve some infrastructure effort to form $X^t X$ and $X^t y$. In practice, when dealing with linear functions where n>>d and using the covariance method described herein, it may be preferable just to find $w(\lambda)$, and validate via a holdout set, rather than computing $U = XVS^{-1}$ as required to compute c and $\text{diag}(G^{-1})$. The SVD and covariance based approaches have the same (asymptotic) computational complexity. However, note that the SVD approach may be more numerically stable.

Once the eigendecomposition of the kernel matrix K (or the SVD of the data matrix) is computed by module 405, for a particular choice of $\lambda$, module 407 operates to form c and $\text{diag}(G^{-1})$ as previously discussed. The leave-one-out (LOO) error computation module 409 is programmed or otherwise configured to receive the collection of regularization parameters ($\lambda$), and to compute the LOO error for each $\lambda$ (e.g., LOO $$\text{error} = \frac{c}{\text{diag}(G^{-1})}).$$

The regularization parameter ($\lambda$) selection module 411 is programmed or otherwise configured to then select the $\lambda$ with the lowest LOO error (e.g., based on comparison of values).

The prediction module 413 is programmed or otherwise configured to predict future data points based on the RLS function associated (e.g., based on expansion coefficients c or hyperplane function w) associated with the best $\lambda$. The output module 415 is programmed or otherwise configured to output an RLS prediction based on an input sound waveform, and more specifically, to the cortical representation of that sound waveform. The output module 415 may be further configured to format and structure the output prediction data as needed (if at all), in preparation for displaying or otherwise reporting that data.

Methodology

Figure 5:
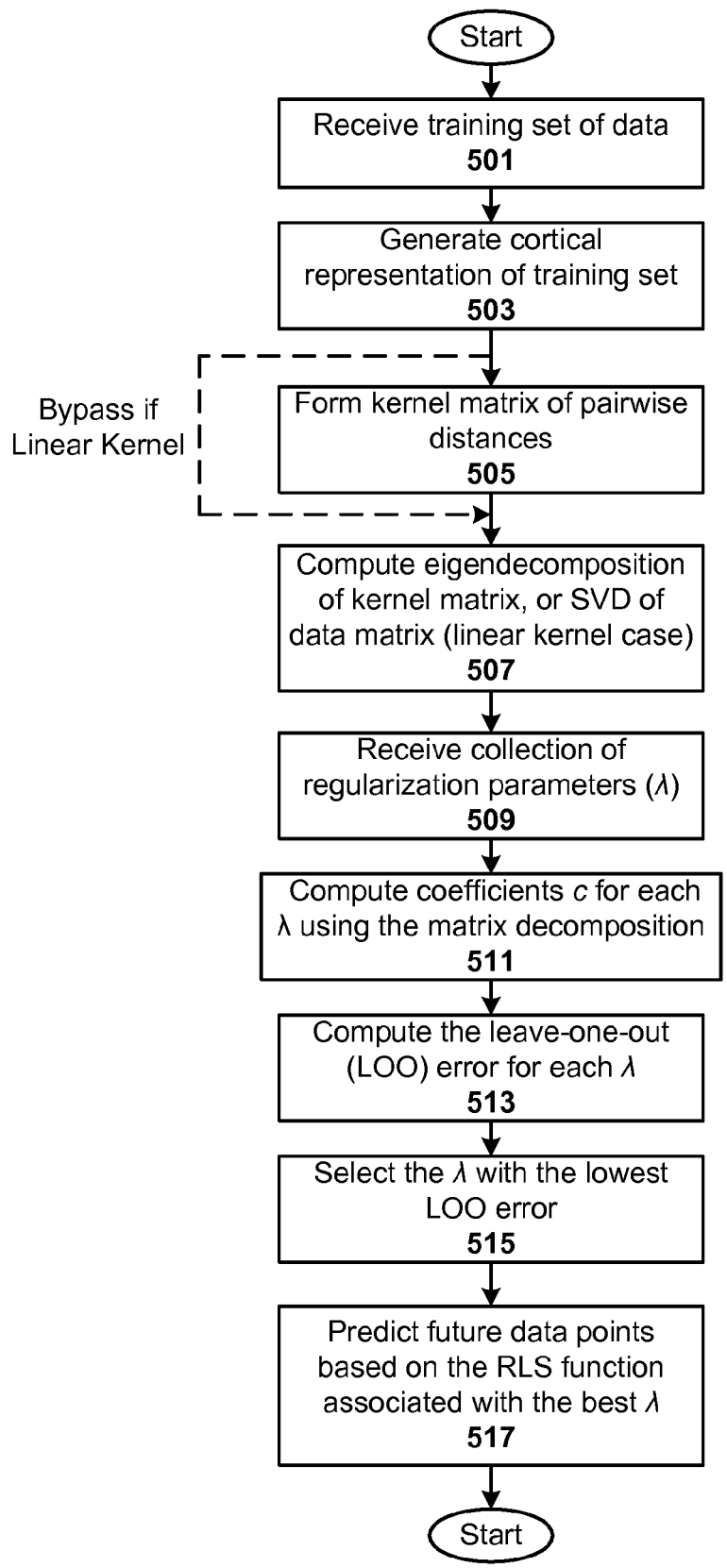
FIG. 5 illustrates a sound discrimination methodology configured in accordance with an embodiment of the present invention.

FIG. 5 illustrates a sound discrimination methodology configured in accordance with an embodiment of the present invention. The method can be carried out, for example, by the sound discriminator module 105 previously discussed with reference to FIGS. 1 through 4.

The method includes receiving 501 a training set of data, and generating 503 a cortical representation of the training set. In the case of a linear kernel, step 505 is skipped and the method continues to step 507. Otherwise, the method continues with forming 505 a kernel matrix of pairwise distances using the cortical representation of the training set. Note that the method may further include receiving an actual dataset (e.g., voice and/or non-voice waveform samples) to be processed, once the RLS classifier module is trained as described herein. These samples will also be converted to cortical representations so that they can be applied to the RLS classifier module and properly categorized.

The method continues with computing 507 the eigendecomposition of the kernel matrix, or computing 507 the SVD of the data matrix (in the case of a linear kernel), as previously explained. One particular embodiment of the present invention is adapted to carryout both eigendecomposition and SVD (e.g., user-configurable). The method further includes receiving 509 a collection of regularization parameters ($\lambda$). The range and resolution of the $\lambda$ collection, which can be provided manually (e.g., input by user) or automatically (e.g., read from a previously stored filed or hard coded or computed dynamically based on user input specifying a target range and resolution) will depend on factors such as the desired accuracy and robustness of the classifier. In one particular embodiment, the collection of $\lambda$s ranges from $10^{-16}$ to $10^{+16}$ and includes a resolution of 200 to 400 intermediate $\lambda$ values evenly spaced therebetween. Such a broad range allows for convergence (e.g., ranges from too small to too big) and provides sufficient resolution without requiring excessive computation to achieve that convergence.

The method continues with computing 511 coefficients (c) for each $\lambda$ using the matrix decomposition computed in step 507 (whether using eigendecomposition or SVD). In one particular embodiment, and as previously explained, the coefficients c can be computed using: $c=V(\Lambda+\lambda I)^{-1}V'y$, as previously explained. Alternatively, can be computed using: $c=U(S^2+\lambda I)^{-1}U'Y+\lambda^{-1}U_\perp U_\perp'Y$ (for the linear kernel case). Note that $diag(G^-)$ can also be computed here, as previously discussed. Once the coefficients c are computed, the method continues with computing 513 the LOO error for each of the $\lambda$s in the collection.

The method continues with selecting 515 the $\lambda$ with the lowest LOO error. As previously explained, this selection of the appropriate $\lambda$ is not trivial and enables an accurate classifier. The method may then proceed with predicting 517 future data points based on the RLS function associated with the best $\lambda$ (e.g., based on coefficients c or hyperplane function w associated with the best $\lambda$). The actual classification application (i.e., what is being predicted, such as face, objects, sounds, etc) or regression application (i.e., size of number being predicted, such as lifespan, salary, etc) can vary, as will be apparent in light of this disclosure.

Further recall (from the previously incorporated U.S. application Ser. No. 11/535,921) that two approaches for rapid LOO RLS processing over a range of $\lambda$ can be used, in accordance with two embodiments of the present invention: an $O(n^3+n^2d)$ time, $O(n^2)$ memory approach for small to moderately sized datasets, and an $O(nd^p)$ time, $O(nd^p)$ memory (where p is the order of the IFGT used) approach for large datasets that employs large $\sigma$.

Implementation Details

Figure 6:
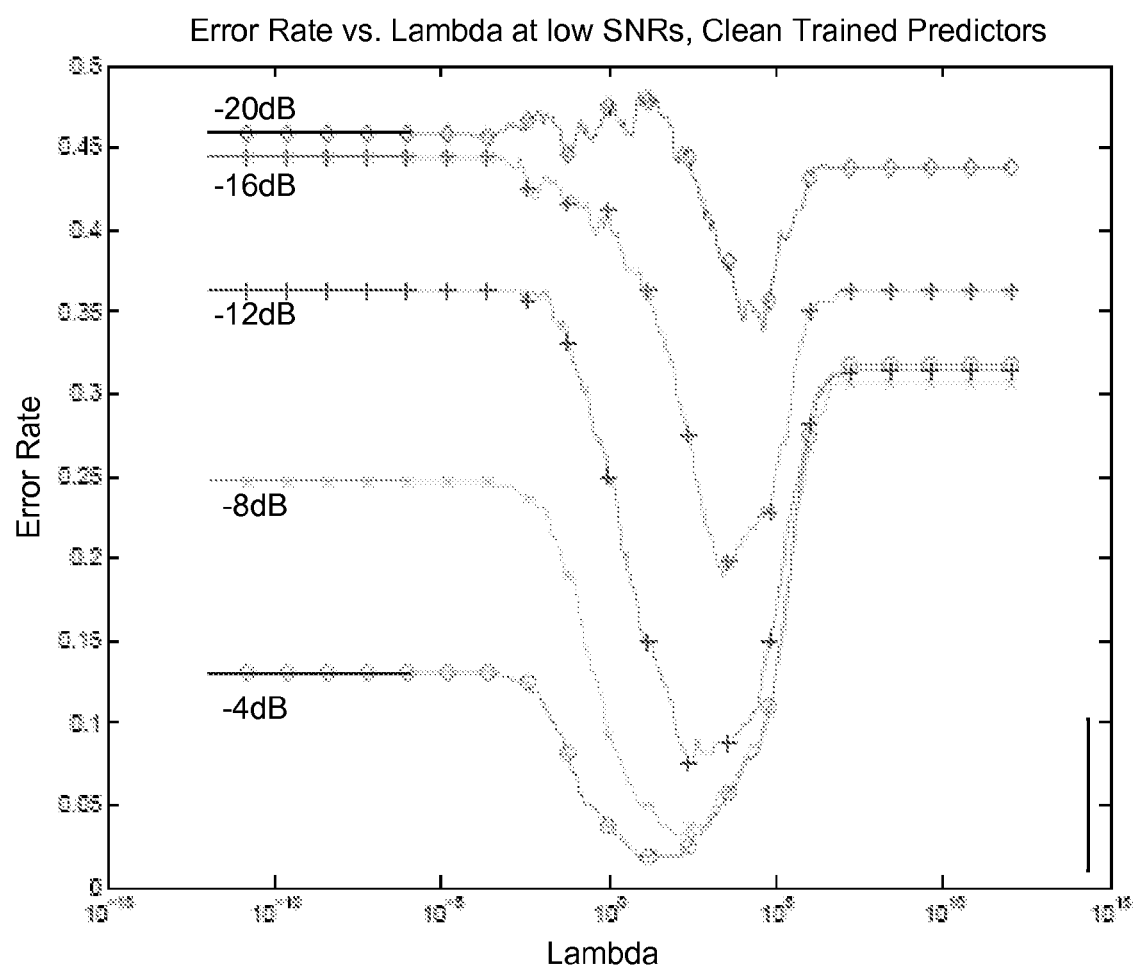

In operation, any suitable training and testing sets can be used, such as those discussed in "Discrimination of speech from non-speech based on multiscale spectro-temporal modulations," Mesgarani, Slaney, and Shamma, IEEE Transactions on Speech and Audio Processing, pp. 920-930, 2006, which is herein incorporated by reference. The data set may include various speech and non-speech samples, depending on the application at hand. For each sample, the average cortical representation over one second from the center of the sound file can be used to represent the sound as a point in a 7,680 dimensional space (in one example case). FIG. 6 shows the equal error rate (EER) of clean trained classifiers across a range of $\lambda$s, for varying SNRs. As the SNR decreases, the appropriate value of $\lambda$ increases, and at very low SNRs, the best $\lambda$ is several orders of magnitude (note the logarithmic x-axis) larger than the best $\lambda$ for clean data. The ability to easily sweep $\lambda$ as described herein enables such observations to be made. Thus, and as will be appreciated in light of this disclosure, a linear classifier can be automatically trained from data and used to obtain desirable performance on a sound classification task. Compared to previous methods, higher accuracy is achieved and no tunable parameters are required. Because no dimensionality reduction is required, the classifying function and examples can be viewed in the same space.

The foregoing description of the embodiments of the invention has been presented for the purposes of illustration and description. It is not intended to be exhaustive or to limit the invention to the precise form disclosed. Many modifications and variations are possible in light of this disclosure. For instance, if only finding accurate c is desired and $diag(G^{-1})$ not needed, then a larger tolerance can be used on a Lanczos process, or a smaller $\sigma$. However, a large $\sigma$ is desirable so that the spectrum of K decays rapidly and the IFGT is accurate; but large $\sigma$ a implies small $\lambda$, which implies a low tolerance on the Lanczos process. Thus, appropriate trades must be considered. In addition, the view of an RLS classifier with a Gaussian kernel (as discussed herein) as a largely local learning scheme is dependent on small or moderate $\sigma$; for large $\sigma$, the farthest point has nearly the same impact as the closest. Furthermore, and in considering the asymptotics of an RLS classifier, note that as $\sigma \to \infty$ and $\lambda \to 0$, the RLS classifier converges into a certain polynomial classification scheme, whose order depends on the rate at which $\lambda/\sigma \to 0$. Likewise, note that the techniques described herein can be equally applied to both RLS classification and RLS regression problems. Also, note that averaging the cortical representation over a time period (e.g., 1 second) may be effectively throwing away valuable dynamic information that is needed to accurately classify certain sounds (e.g., animal sounds, such as a dog barking). Thus, embodiments for detecting such sounds can be programmed or otherwise configured to incorporate that dynamic information, for example, by averaging the cortical representation over smaller time periods (e.g., 0.1 to 0.7 seconds) and/or by using less lossy statistical representations (relative to averaging), such as composed receptive fields histograms of higher dimensionality (CRFH) and other multidimensional statistical representations. It is intended that the scope of the invention be limited not by this detailed description, but rather by the claims appended hereto.

What is claimed is:

1. A computer implemented methodology for sound discrimination, comprising:
  receiving a training set of sound waveforms;
  generating a cortical representation of the training set;
  computing a matrix decomposition using the cortical representation of the training set including computing a singular value decomposition (SVD) using the cortical representation of the training set, wherein the SVD is the matrix decomposition;
  receiving a plurality of regularization parameters;
  computing coefficients for each regularization parameter using the matrix decomposition;
  computing a leave-one-out (LOO) error for each of the regularization parameters; and
  selecting the regularization parameter with the lowest LOO error.

2. The method of claim 1 further comprising:
  predicting future data points based on at least one of coefficients c or a hyperplane function w associated with the selected regularization parameter.

3. The method of claim 1 wherein computing a matrix decomposition using the cortical representation of the training set includes:
  forming a kernel matrix using the cortical representation of the training set; and
  computing an eigendecomposition of the kernel matrix, wherein the eigendecomposition is the matrix decomposition.

4. The method of claim 3 wherein the kernel matrix is represented explicitly, the
  method further comprising:
  storing the kernel matrix.

5. The method of claim 3 wherein the kernel matrix is represented explicitly, and the method computes the LOO error for all the regularization parameters in $O(n^3+n^2 d)$ time and $O(n^2)$ space, where n is the number of points in d dimensions of the cortical representation of the training set.

6. The method of claim 3 wherein the kernel matrix is an n by n matrix K satisfying $K_{ij}=K(\bar{x}_i,\bar{x}_j)$ and having a form $$K(\bar{x}, \bar{x}_j) = \exp\left(\frac{\|\bar{x}_i - \bar{x}_j\|^2}{2\sigma^2}\right),$$

where x is a vector of data points included in the cortical representation of the training set and σ is a user-selected bandwidth parameter.

7. A machine-readable medium encoded with instructions, that when executed by one or more processors, cause the processor to carry out a process for sound discrimination, the process comprising:
  receiving a training set of sound waveforms;
  generating a cortical representation of the training set;
  computing a matrix decomposition using the cortical representation of the training set including computing a singular value decomposition (SVD) using the cortical representation of the training set, wherein the SVD is the matrix decomposition;
  receiving a plurality of regularization parameters;
  computing coefficients for each regularization parameter using the matrix decomposition;
  computing a leave-one-out (LOO) error for each of the regularization parameters; and
  selecting the regularization parameter with the lowest LOO error.

8. The machine-readable medium of claim 7 further comprising:
  predicting future data points based on at least one of coefficients c or a hyperplane function w associated with the selected regularization parameter.

9. The machine-readable medium of claim 7 wherein computing a matrix decomposition using the cortical representation of the training set includes:
  forming a kernel matrix using the cortical representation of the training set; and
  computing an eigendecomposition of the kernel matrix, wherein the eigendecomposition is the matrix decomposition.

10. The machine-readable medium of claim 9 wherein the kernel matrix is represented explicitly, the process further comprising:
  storing the kernel matrix.

11. The machine-readable medium of claim 9 wherein the kernel matrix is represented explicitly, and the process computes the LOO error for all the regularization parameters in $O(n^3+n^2 d)$ time and $O(n^2)$ space, where n is the number of points in d dimensions of the cortical representation of the training set.

12. The machine-readable medium of claim 9 wherein the kernel matrix is an n by n matrix K satisfying $K_{ij}=K(\bar{x}_i,\bar{x}_j)$ and having a form $$K(\bar{x}, \bar{x}_j) = \exp\left(\frac{\|\bar{x}_i - \bar{x}_j\|^2}{2\sigma^2}\right),$$

where x is a vector of data points included in the cortical representation of the training set and σ is a user-selected bandwidth parameter.

13. A sound discrimination system, comprising:
  a cortical representation module for receiving a training set of sound waveforms and generating a cortical representation of the training set;
  a matrix decomposition module for computing a matrix decomposition using the cortical representation of the training set and for computing a singular value decomposition (SVD) using the cortical representation of the training set, wherein the SVD is the matrix decomposition;
  a coefficient computation module for receiving a plurality of regularization parameters and computing coefficients for each regularization parameter using the matrix decomposition;
  a LOO error computation module for receiving the plurality of regularization parameters and computing a leave-one-out (LOO) error for each of the regularization parameters; and
  a regularization parameter selection module for selecting the regularization parameter with the lowest LOO error.

14. The system of claim 13 further comprising:
  a prediction module for predicting future data points based on at least one of coefficients c or a hyperplane function w associated with the selected regularization parameter.

15. The system of claim 13 further comprising:
  a kernel matrix generator for forming a kernel matrix using the cortical representation of the training set;
  wherein the matrix decomposition module for computing a matrix decomposition using the cortical representation of the training set is for computing an eigendecomposition of the kernel matrix, wherein the eigendecomposition is the matrix decomposition.

16. The system of claim 15 wherein the kernel matrix is represented explicitly, the system further comprising:
a memory for storing the kernel matrix.

17. The system of claim 15 wherein the kernel matrix is represented explicitly, and the system computes the LOO error for all the regularization parameters in $O(n^3+n^2d)$ time and $O(n^2)$ space, where n is the number of points in d dimensions of the cortical representation of the training set.

18. The system of claim 15 wherein the kernel matrix is an n by n matrix K satisfying $K_{ij}=K(\bar{x}_i,\bar{x}_j)$ and having a form $$K(\bar{x},\bar{x}_j) = \exp\left(\frac{\|\bar{x}_i - \bar{x}_j\|^2}{2\sigma^2}\right),$$

where x is a vector of data points included in the cortical representation of the training set and σ is a user-selected bandwidth parameter.

19. A computer implemented methodology for sound discrimination, comprising:
receiving a training set of sound waveforms;
generating a cortical representation of the training set comprising converting the sound waveforms into an auditory spectrogram; and
performing a two dimensional wavelet transform of the auditory spectrogram;
computing a matrix decomposition using the cortical representation of the training se;
receiving a plurality of regularization parameters;
computing coefficients for each regularization parameter using the matrix decomposition;
computing a leave-one-out (LOO) error for each of the regularization parameters; and
selecting the regularization parameter with the lowest LOO error.

20. A machine-readable medium encoded with instructions, that when executed by one or more processors, cause the processor to carry out a process for sound discrimination, the process comprising:
receiving a training set of sound waveforms;
generating a cortical representation of the training set comprising converting the sound waveforms into an auditory spectrogram; and performing a two dimensional wavelet transform of the auditory spectrogram;
computing a matrix decomposition using the cortical representation of the training set;
receiving a plurality of regularization parameters;
computing coefficients for each regularization parameter using the matrix decomposition;
computing a leave-one-out (LOO) error for each of the regularization parameters; and
selecting the regularization parameter with the lowest LOO error.

21. A sound discrimination system, comprising:
a cortical representation module for receiving a training set of sound waveforms and generating a cortical representation of the training set and for converting the sound waveforms into an auditory spectrogram and performing a two dimensional wavelet transform of the auditory spectrogram;
a matrix decomposition module for computing a matrix decomposition using the cortical representation of the training set;
a coefficient computation module for receiving a plurality of regularization parameters and computing coefficients for each regularization parameter using the matrix decomposition;
a LOO error computation module for receiving the plurality of regularization parameters and computing a leave-one-out (LOO) error for each of the regularization parameters; and
a regularization parameter selection module for selecting the regularization parameter with the lowest LOO error.

* * * * *

UNITED STATES PATENT AND TRADEMARK OFFICE
CERTIFICATE OF CORRECTION

| | | |
|---|---|---|
| PATENT NO. | : 7,853,539 B2 | Page 1 of 1 |
| APPLICATION NO. | : 11/559812 | |
| DATED | : December 14, 2010 | |
| INVENTOR(S) | : Ryan Rifkin | |

It is certified that error appears in the above-identified patent and that said Letters Patent is hereby corrected as shown below:

Column 15, line 29, Claim 19 delete "se;" and insert --set;--.

Signed and Sealed this
Thirty-first Day of May, 2011

David J. Kappos
*Director of the United States Patent and Trademark Office*